(12) United States Patent
Bean et al.

(10) Patent No.: US 11,493,342 B2
(45) Date of Patent: Nov. 8, 2022

(54) CHIP-SCALE GYROMETRIC APPARATUS

(71) Applicant: Rockwell Collins, Inc., Cedar Rapids, IA (US)

(72) Inventors: Reginald D. Bean, Center Point, IA (US); Nathaniel P. Wyckoff, Marion, IA (US); Jeremiah Wolf, Atkins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 141 days.

(21) Appl. No.: 16/746,465

(22) Filed: Jan. 17, 2020

(65) Prior Publication Data

US 2021/0223045 A1 Jul. 22, 2021

(51) Int. Cl.
| | |
|---|---|
| *G01C 19/5691* | (2012.01) |
| *G01S 19/39* | (2010.01) |
| *G01S 19/46* | (2010.01) |
| *G01S 19/47* | (2010.01) |

(52) U.S. Cl.
CPC ........ *G01C 19/5691* (2013.01); *G01S 19/393* (2019.08); *G01S 19/46* (2013.01); *G01S 19/47* (2013.01)

(58) Field of Classification Search
CPC ......... G01S 19/393; G01S 19/46; G01S 19/47
USPC ...................................... 342/357.3, 417, 463
See application file for complete search history.

(56) References Cited

U.S. PATENT DOCUMENTS

| | | |
|---|---|---|
| 3,861,220 A | 1/1975 | Felsenthal, Jr. |
| 4,699,005 A | 10/1987 | Okabe |
| 2011/0101955 A1 | 5/2011 | Hung et al. |
| 2015/0362318 A1* | 12/2015 | Tai ........................ G01C 19/722 356/461 |
| 2016/0356601 A1* | 12/2016 | Lescourret ........... G01C 21/165 |

* cited by examiner

*Primary Examiner* — Bo Fan
(74) *Attorney, Agent, or Firm* — Suiter Swantz pc llo

(57) ABSTRACT

A chip-scale gyrometric apparatus is disclosed. In embodiments, the chip-scale gyrometric apparatus includes a dielectric substrate and an antenna element attached thereto for receiving an inbound signal having an initial phase. The apparatus includes a splitter for splitting the inbound signal into two equivalent signals, and two coils connected to the splitter. The first coil carries one of the split signals in a clockwise (CW) path relative to a rotational axis, while the second coil carries the other split signal in a counterclockwise (CCW) path relative to the same axis. An integrated circuit (IC) on the substrate and connected to the first and second coils measures a phase shift between the first and second signals (e.g., deviation from the initial phase) based on their respective CW and CCW paths and determines, based on the measured phase shift, a degree of rotation relative to the common rotational axis.

13 Claims, 4 Drawing Sheets

CHIP-SCALE GYROMETRIC APPARATUS

TECHNICAL FIELD

The subject matter disclosed in the instant application is directed generally to positioning systems and more particularly to gyrometric hardware.

BACKGROUND

Trusted systems may require additional hardware to verify trust in external components or functions. For example, size, weight, power, and cost (SWaPC)-constrained navigation systems may require small form factor hardware to provide a check against external measurements originating from other assemblies, e.g., absolute or inertial positioning systems. Further, while chip-scale solutions are currently available for absolute positioning (e.g., Global Positioning System (GPS) and other satellite-based navigational systems) or relative positioning solutions (e.g. inertial measurement units (IMU)), there is no equivalent solution for gyrometry or gyroscopy.

SUMMARY

A chip-scale gyrometric apparatus is disclosed. In embodiments, the chip-scale gyrometric apparatus includes a dielectric substrate and an antenna element attached thereto for receiving an inbound signal having an initial phase. The apparatus includes a splitter for splitting the inbound signal into two equivalent signals. The apparatus includes two coils connected to the splitter; the first coil carries one of the split signals in a clockwise (CW) path relative to a rotational axis and the second coil carries the other split signal in a counterclockwise (CCW) path relative to the same rotational axis. The apparatus includes an integrated circuit (IC) on the substrate and connected to the first and second coils; the IC measures a phase shift between the first and second signals (having a common initial phase) based on their respective CW and CCW paths and determines, based on the measured phase shift, a degree of rotation relative to the rotational axis common to the two coils.

A multi-axis chip-scale gyrometric apparatus is also disclosed. In embodiments, the multi-axis apparatus includes at least two dielectric substrates, each substrate defining a plane and associated with a rotational axis. A gyrometric assembly is attached to each substrate, each gyrometric assembly including an antenna element attached thereto for receiving an inbound signal having an initial phase. Each gyrometric assembly includes a splitter for splitting the inbound signal into two equivalent signals. Each gyrometric assembly includes two coils connected to the splitter; the first coil carries one of the split signals in a clockwise (CW) path relative to a rotational axis and the second coil carries the other split signal in a counterclockwise (CCW) path relative to the same rotational axis. Each gyrometric assembly includes an integrated circuit (IC) on the substrate and connected to the first and second coils; each IC measures a phase shift between the first and second signals (having a common initial phase) based on their respective CW and CCW paths and determines, based on the measured phase shift, a degree of rotation relative to the rotational axis (for each of multiple rotational axes, e.g., x/y/z, pitch/roll/yaw).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
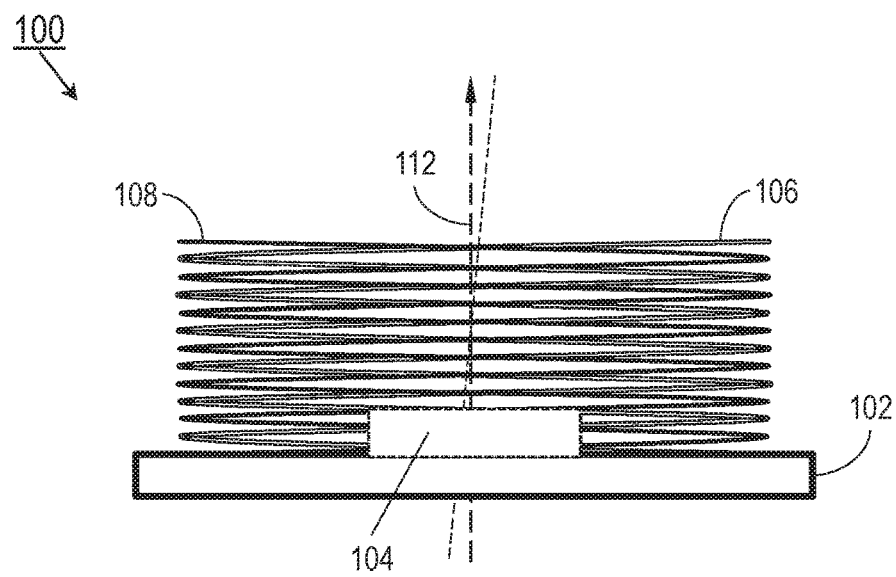
FIGS. 1 and 2 are respectively profile and overhead views of a chip-scale gyrometric apparatus in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Figure 2:
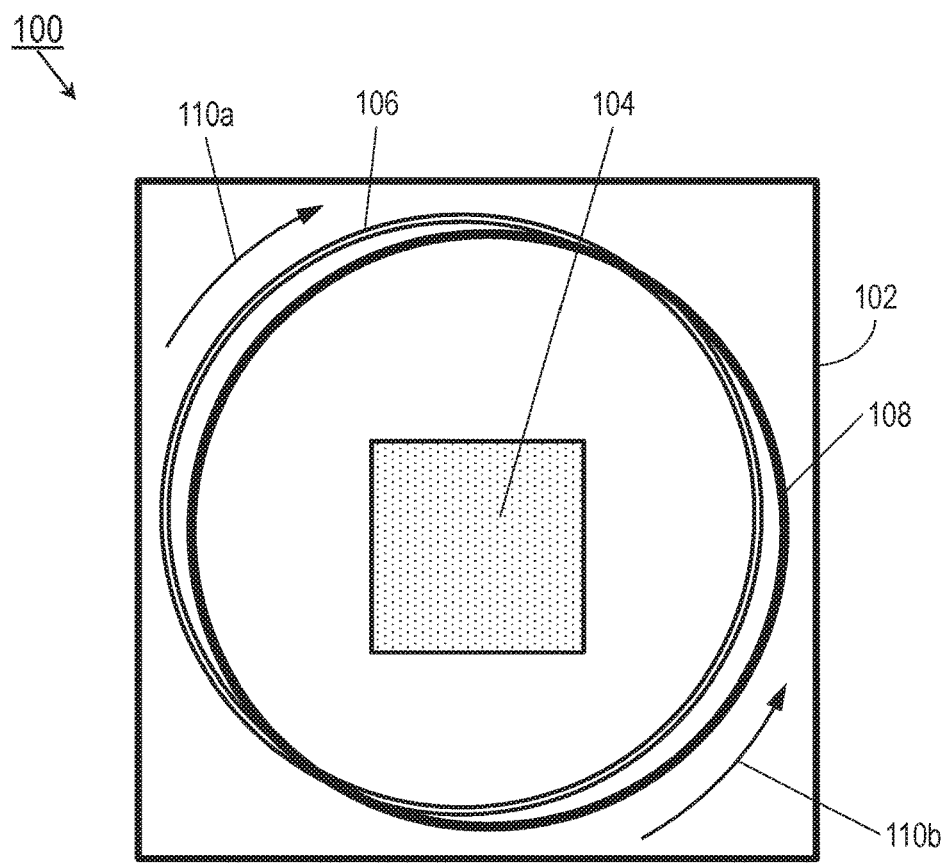

Referring to FIGS. 1 and 2, a chip-scale gyrometric assembly 100 is disclosed. The chip-scale gyrometric assembly may include a chip-scale dielectric substrate 102 (e.g., 4 inches or less in diameter), an integrated circuit 104 (IC), clockwise (CW) coil 106, and counterclockwise (CCW) coil 108.

In embodiments, the chip-scale gyrometric assembly 100 may split a sourced signal into two separate coils, e.g., the CW coil 106 and CCW coil 108. For example, each split signal may originate with an initial phase consistent with that of the sourced signal. One split signal 110a may travel clockwise through the CW coil 106 while the other split signal 110b travels counterclockwise through the CCW coil 108 in the same plane (e.g., relative to a rotational axis 112 perpendicular to the plane of the substrate 102 and of the CW and CCW coils). The CW coil 106 and CCW coil 108 may be wire coils attached to the substrate 102, through which the split inbound radio frequency (RF) signals 110a-b travel in CW and CCW directions respectively. In some embodiments, the inbound signal and split signals 110a-b may be photonic or optical signals or carrier waves, and the CW and CCW coils 106, 108 fashioned of optical fibers or any like optical medium.

In embodiments, the chip-scale gyrometric assembly 100 may utilize interferometric techniques to monitor the interference patterns generated by the superimposed split signals 110a-b traveling through the CW coil 106 and CCW coil 108. For example, the respective rotation of the CW and CCW coils 106, 108 around the rotational axis 112 may result in a phase shift on the part of the signals traveling through the CW and CCW coils (e.g., relative to the initial phase of the inbound signal or to each other). At high enough frequencies (e.g., above 50 GHz), such phase shifts may be associated with a very small amount of rotation.

In embodiments, the CW and CCW coils 106, 108 may be of sufficient length to provide, given a chip-scale substrate 102 and the correspondingly small amount of rotation around the rotational axis 112, a measurable phase shift between the split signals 110a-b. For example, the chip-scale gyrometric assembly 100 may incorporate multilayer loops of CW and CCW coils 106, 108 incorporating hundreds of loops of submicron thickness above the IC 104. The IC 104 may incorporate internal transmitter and receiver circuitry capable of detecting the phase shift between the CW and CCW coils 106, 108 and determining, based on the measured phase shift, a degree of rotation relative to the rotational axis 112. In some embodiments, the CW and CCW coils 106, 108 may be otherwise positioned or disposed with respect to the substrate 102 (e.g., side by side as opposed to overlapping (as shown by FIGS. 1 and 2), while still sharing a common rotational axis 110). In some embodiments, the rotational axis 112a may be only substantially perpendicular, rather than precisely perpendicular, to the plane of the substrate 102; provided the rotational axis 112a is common to the CW and CCW coils 106, 108, the IC 104 may mathematically correct for any deviations from a 90-degree precise perpendicularity between the rotational axis 112a and the plane of the substrate 102.

Figure 3:
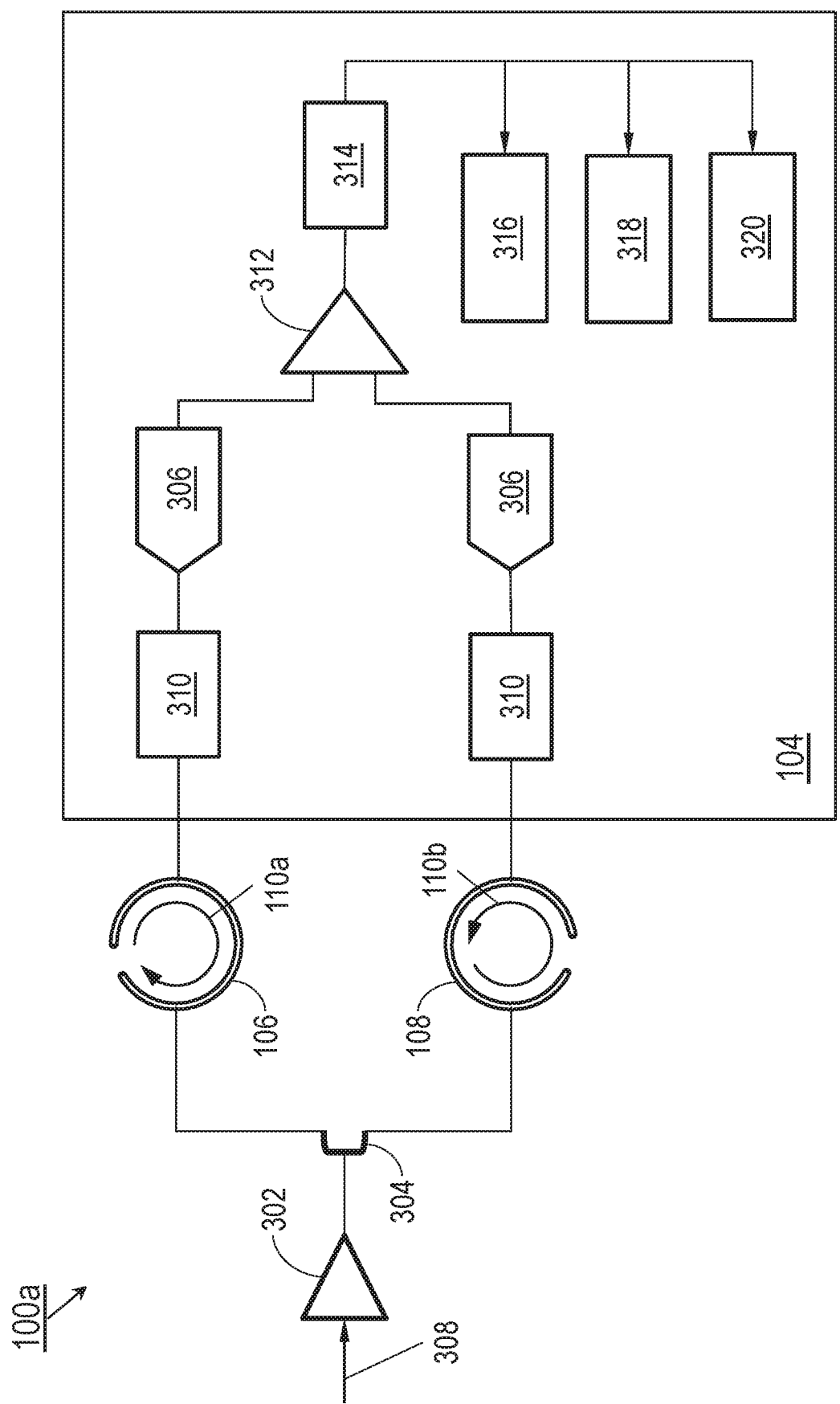
FIG. 3 is a block diagram illustrating the chip-scale gyrometric apparatus of FIGS. 1 and 2.

Referring to FIG. 3, the chip-scale gyrometric apparatus 100a may be implemented and may function similarly to the chip-scale gyrometric apparatus 100 of FIGS. 1 and 2, except that the chip-scale gyrometric apparatus 100a may include antenna elements 302, signal splitters 304, and analog-digital converters 306 (ADC).

In embodiments, the chip-scale gyrometric apparatus 100a may receive the source signal 308 via the antenna elements 302. The source signal 308 may be split by the signal splitters 304 into identical split signals 110a-b of shared phase. As the split signals 110a-b travel (in respective CW and CCW directions) through the CW and CCW coils 106, 108, the relative phase of the split signals 110a-b may shift, such that the IC 104 may detect (310) the phase of the split signals at the terminal end of the CW and CCW coils. The detected phases of the split signals 110a-b may be digitized via ADCs 306 and compared (e.g., via comparators 312 or similar circuitry) to determine a relative phase shift from which a degree of rotation (314) may be calculated.

In embodiments, the determined degree of rotation 314 may be fed into other components of the IC 104. For example, the determined degree of rotation 314 may be forwarded to Kalman filters 316, e.g., to facilitate estimation or prediction of future rotation. In some embodiments, the degree of rotation 314 (relative to a particular rotational axis (112, FIG. 1) may be forwarded for use as a partial check for a positioning system integrated into the IC 104, e.g., a satellite-based absolute positioning system 318 (e.g., GPS or other GNSS-based satellite navigational systems) or inertial measurement unit 320 (IMU).

Figure 4A:
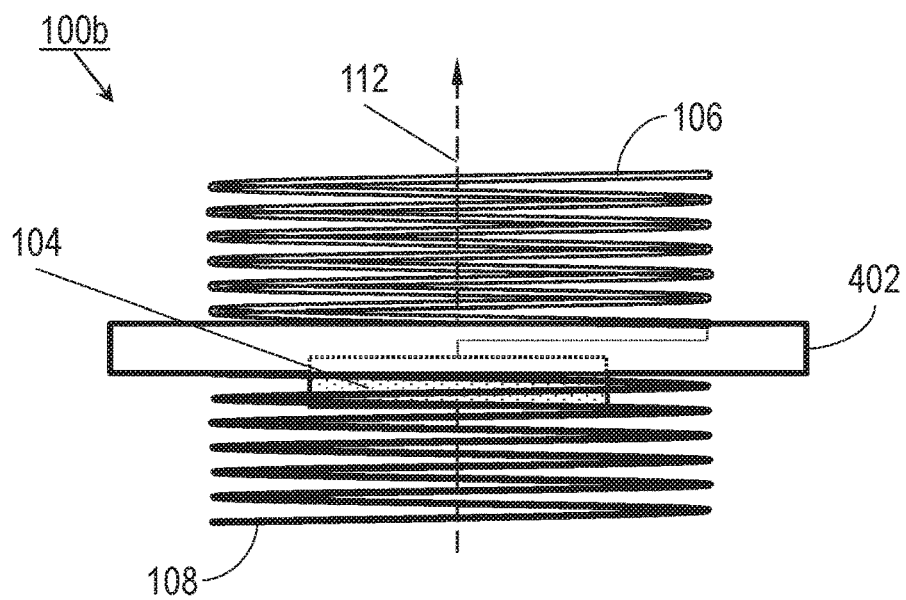
FIGS. 4A and 4B are respectively profile and overhead views of the chip-scale gyrometric apparatus of FIGS. 1 and 2.
Figure 4B:
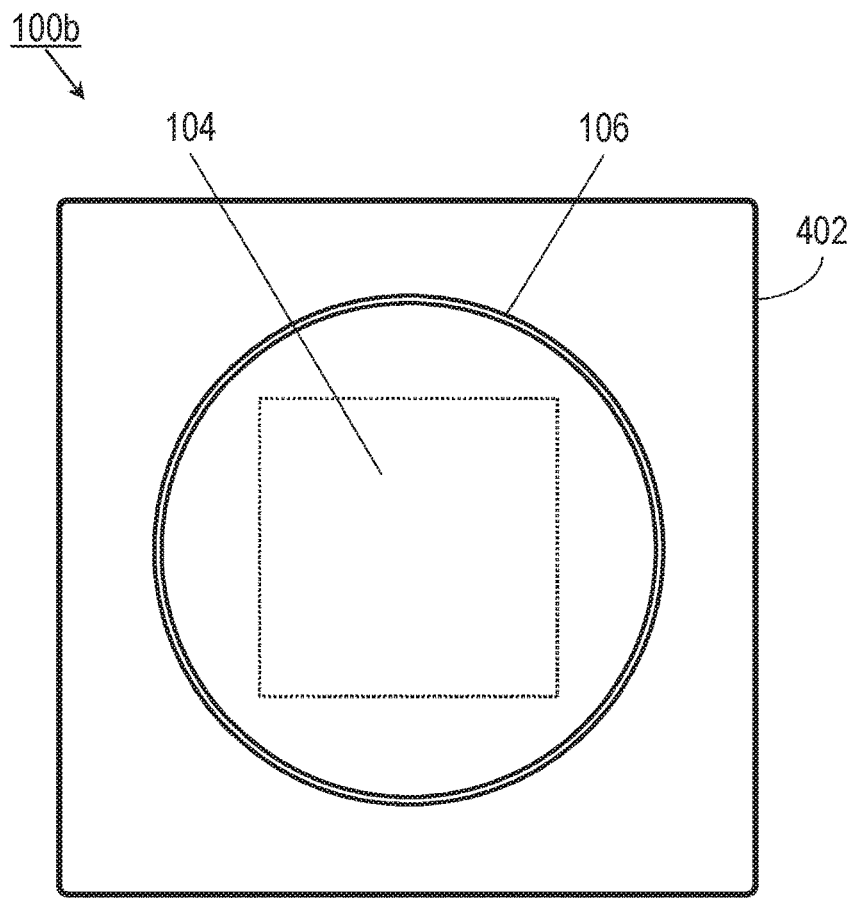

Referring now to FIGS. 4A and 4B, the chip-scale gyrometric assembly 100b may be implemented and may function similarly to the chip-scale gyrometric assemblies 100, 100a of FIGS. 1 through 3, except that the chip-scale gyrometric assembly 100b may incorporate an interposer layer 402.

In embodiments, the CW and CCW coils 106, 108 may be positioned on opposing faces of the interposer layer 402 and interface with the IC 104 via the interposer, while sharing a common rotational axis 112. For example, the IC 104 may be fully or partially embedded in a cavity within the interposer layer 402.

Figure 5:
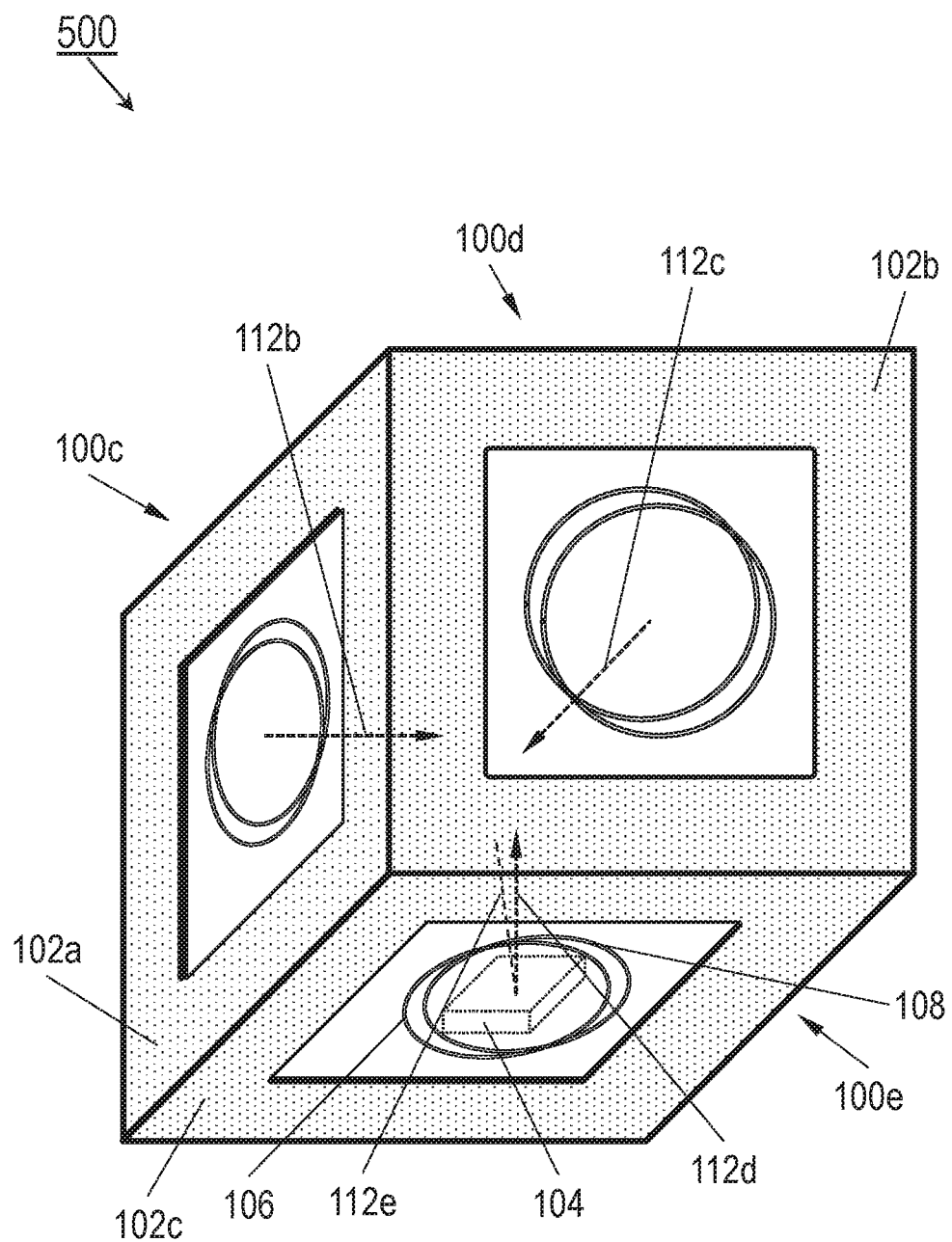
FIG. 5 is an isometric view of a chip-scale gyrometric apparatus according to example embodiments of this disclosure.

Referring to FIG. 5, the multiaxis chip-scale gyrometric apparatus 500 may be implemented and may function similarly to the chip-scale gyrometric assemblies 100, 100a-b of FIGS. 1 through 4B, except that the multiaxis chip-scale gyrometric apparatus 500 may incorporate multiple gyrometric assemblies 100c-e, each individual assembly 100c-e similar to the chip-scale gyrometric assemblies 100, 100a-b but configured to determine a degree of rotation (314, FIG. 3) with respect to mutually perpendicular rotational axes 112b-d. In some embodiments, the multiaxis chip-scale gyrometric apparatus 500 may incorporate two gyrometric assemblies 100c-d corresponding to two rotational axes 112b-c. For example, the multiaxis chip-scale gyrometric apparatus 500 may determine changes in rotational orientation relative to the longitudinal and lateral axes (e.g., rotational axes 112b-d) as well as a vertical or z-axis (e.g., rotational axis 112d; via the chip-scale gyrometric assembly 100e), e.g., for aircraft-based implementation. In some embodiments, the mutually perpendicular substrates 102a-c of the multiaxis chip-scale gyrometric apparatus 500 may be fashioned of a single flexible circuit card assembly folded into the mutually perpendicular orientations shown by FIG. 5 and molded into a single package, e.g., whereby the individual chip-scale gyrometric assemblies 100c-e share common antenna elements (302, FIG. 3) and/or ICs (104, FIG. 3).

In some embodiments, the mutually perpendicular rotational axes 112b-d may be substantially perpendicular, rather than precisely perpendicular as shown by FIG. 5. For example, one or more rotational axes (112e) may not be aligned at precisely 90 degrees to the other mutually perpendicular rotational axes 112b-c, or to its corresponding substrate 102c. In some embodiments, the IC 104 of the corresponding chip-scale gyrometric assembly 100e may mathematically correct for any deviations from precise perpendicularity on the part of the rotational axis 112e or the substrate 102c, provided the rotational axis 112e is common to the CW and CCW coils 106, 108 of the chip-scale gyrometric assembly. In some embodiments, each chip-scale gyrometric assembly 100c-e may have its own IC 104, the separate ICs in communication with each other.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A chip-scale gyrometric apparatus, comprising:
   a dielectric substrate;
   at least one antenna element attached to the substrate and configured to receive an inbound signal associated with an initial phase;
   a splitter coupled to the antenna element and configured to split the inbound signal into a first signal and a second signal;
   a first coil and a second coil coupled to the splitter, the first coil structurally distinct from the second coil, the first coil configured to carry the first signal in a counter-clockwise path relative to a rotational axis and the second coil configured to simultaneously carry the second signal in a clockwise path relative to the rotational axis;
   and
   at least one integrated circuit (IC) attached to the substrate and coupled to the first coil and the second coil, the IC configured to:
   measure at least one of a first phase shift associated with the first signal and a second phase shift associated with the second signal;
   determine a relative phase change based on at least one of the first phase shift and the second phase shift; and
   determine, based on the relative phase change, a degree of rotation relative to the rotational axis,
   wherein the first coil comprises a first plurality of adjacent and stacked layers and the second coil comprises a second plurality of adjacent and stacked layers,
   wherein each layer of the first plurality of adjacent and stacked layers and the second plurality of adjacent and stacked layers comprises a loop and has a thickness that is submicron,
   and
   wherein the first coil is overlapping with the second coil such that portions of the first coil are disposed between portions of the second coil.

2. The chip-scale gyrometric apparatus of claim 1, wherein at least one of the first phase shift and the second phase shift is associated with a deviation from the initial phase.

3. The chip-scale gyrometric apparatus of claim 1, wherein:
   the inbound signal is a radio frequency (RF) inbound signal;
   and
   the at least one IC is an RFIC.

4. The chip-scale gyrometric apparatus of claim 1, wherein:
   the inbound signal is an optical signal;
   the first coil includes a first optical fiber;
   and
   the second coil includes a second optical fiber.

5. The chip-scale gyrometric apparatus of claim 1, wherein the IC includes a first analog-digital converter (ADC) configured to digitize the first phase shift and a second ADC configured to digitize the second phase shift.

6. The chip-scale gyrometric apparatus of claim 1, wherein the IC includes at least one of:
   a position receiver configured to determine an absolute position based on at least one signal received from a navigational satellite;
   an inertial measurement unit (IMU) configured to determine a relative position;
   or
   a Kalman filter.

7. The chip-scale gyrometric apparatus of claim 1, wherein:
   the substrate defines a plane;
   and
   the rotational axis is perpendicular to the plane.

8. A chip-scale gyrometric apparatus, comprising:
   a plurality of dielectric substrates including at least:
   a first substrate defining a first plane;
   a second substrate attached to the first substrate and defining a second plane;
   and
   a third substrate attached to the first and second substrates and defining a third plane;
   a gyrometric assembly attached to each substrate of the plurality of substrates, each gyrometric assembly comprising:
   at least one antenna element attached to the substrate and configured to receive an inbound signal associated with an initial phase;
   a splitter coupled to the antenna element and configured to split the inbound signal into a first signal and a second signal;
   a first coil and a second coil coupled to the splitter, the first coil structurally distinct from the second coil, the first coil configured to carry the first signal in a counterclockwise path relative to a rotational axis and the second coil configured to simultaneously carry the second signal in a clockwise path relative to the rotational axis; and one or more integrated circuits (IC) attached to one or more of the plurality of substrates, the one or more IC coupled to each first coil and each second coil and configured to:

measure at least one of a first phase shift associated with each first signal and a second phase shift associated with each corresponding second signal;

determine a relative phase change based on at least one of the first phase shift and the second phase shift; and determine, based on the relative phase change, a degree of rotation relative to the rotational axis, wherein the first coil comprises a first plurality of adjacent and stacked layers and the second coil comprises a second plurality of adjacent and stacked layers, wherein each layer of the first plurality of adjacent and stacked layers and the second plurality of adjacent and stacked layers comprises a loop and has a thickness that is submicron;

and wherein the first substrate, the second substrate, and the third substrate are fashioned from a single flexible substrate folded into mutually perpendicular orientations such that the first substrate, the second substrate, and the third substrate are mutually perpendicular substrates.

9. The chip-scale gyrometric apparatus of claim 8, wherein:
the inbound signal is a radio frequency (RF) inbound signal;
and
the one or more IC includes at least one RFIC.

10. The chip-scale gyrometric apparatus of claim 8, wherein:
the inbound signal is an optical signal;
each first coil includes a first optical fiber;
and
each second coil includes a second optical fiber.

11. The chip-scale gyrometric apparatus of claim 8, wherein the one or more IC include at least one first analog-digital converter (ADC) configured to digitize the first phase shift and at least one second ADC configured to digitize the second phase shift.

12. The chip-scale gyrometric apparatus of claim 8, wherein the one or more IC include at least one of:
a position receiver configured to determine an absolute position based on at least one signal received from a navigational satellite;
an inertial measurement unit (IMU) configured to determine a relative position;
or
a Kalman filter.

13. The chip-scale gyrometric apparatus of claim 8, wherein:
the rotational axis of each gyrometric assembly is perpendicular to the corresponding substrate.

* * * * *